US012467924B2

(12) United States Patent
James et al.

(10) Patent No.: US 12,467,924 B2
(45) Date of Patent: Nov. 11, 2025

(54) DOUBLE DEAMIDATED FORM OF Bcl-xL IS A BIOMARKER OF PLATELET AGE

(71) Applicants: INSERM (INSTITUT NATIONAL DE LA SANTÉ ET DE LA RECHERCHE MÉDICALE), Paris (FR); UNIVERSITÉ DE BORDEAUX, Bordeaux (FR); CHU DE BORDEAUX, Talence (FR); CENTRE NATIONAL DE LA RECHERCHE SCIENTIFIQUE (CNRS), Paris (FR)

(72) Inventors: Chloé James, Pessac (FR); Florian Beaumatin, Bordeaux (FR); Muriel Priault, Bordeaux (FR)

(73) Assignees: INSERM (INSTITUT NATIONAL DE LA SANÉ ET DE LA RECHERCHE MÉDICALE, Paris (FR); UNIVERSITÉ DE BORDEAUX, Bordeaux (FR); CHU DE BORDEAUX, Bordeaux (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 1003 days.

(21) Appl. No.: 17/617,617

(22) PCT Filed: Jun. 11, 2020

(86) PCT No.: PCT/EP2020/066210
§ 371 (c)(1),
(2) Date: Dec. 9, 2021

(87) PCT Pub. No.: WO2020/249678
PCT Pub. Date: Dec. 17, 2020

(65) Prior Publication Data
US 2022/0236270 A1 Jul. 28, 2022

(30) Foreign Application Priority Data
Jun. 12, 2019 (EP) .................................... 19305750

(51) Int. Cl.
*G01N 33/569* (2006.01)
*G01N 33/532* (2006.01)
(52) U.S. Cl.
CPC ..... *G01N 33/56966* (2013.01); *G01N 33/532* (2013.01); *G01N 2440/16* (2013.01); *G01N 2800/222* (2013.01)

(58) Field of Classification Search
None
See application file for complete search history.

(56) References Cited

FOREIGN PATENT DOCUMENTS

WO WO-2008017123 A1 * 2/2008 ......... A01K 67/0276

OTHER PUBLICATIONS

Beaumatin et al. N52 monodeamidated Bcl-xL shows impaired oncogenic properties in vivo and in vitro. Oncotarget, vol. 7, No. 13, Mar. 29, 2016 (Mar. 29, 2016), pp. 17129-17143 (Year: 2016).*
Gang Deng et al: "Investigation of platelet apoptosis in adult patients with chronic immune thrombocytopenia", Hematology, vol. 22, No. 3, Oct. 13, 2016, pp. 155-161.
Florian Beaumatin et al: "N52 monodeamidated Bcl-x L shows impaired oncogenic properties in vivo and in vitro", Oncotarget, vol. 7, No. 13, Mar. 29, 2016, pp. 17129-17143.
Takehara Tetsuo et al: "Suppression of Bcl-xL deamidation in human hepatocellular carcinomas", Cancer Research, American Association for Cancer Research, US, vol. 63, No. 12, Jun. 15, 2003, pp. 3054-3057.
Zhao R et al: "An oncogenic tyrosine kinase inhibits DNA repair and DNA-damage-induced Bcl-Xl deamidation in T cell transformation", Cancerl Cell, Cell Press, US, vol. 5, No. 1, Jan. 2004, pp. 37-49.

* cited by examiner

*Primary Examiner* — Jennifer Dunston
*Assistant Examiner* — Tiffany Nicole Grooms
(74) *Attorney, Agent, or Firm* — WCF IP

(57) ABSTRACT

Deamidation is usually viewed as a post-translational modification that sets an expiration date on proteins. Among apoptosis regulators of the Bcl-2 family, Bcl-xL shows a unique eligibility to be either singly or doubly deamidated. The inventors therefore analysed Bcl-xL deamidation state in platelets from mice models where platelets lifespan was manipulated. In parallel, the inventors compared human platelets obtained at steady state from healthy controls, to platelets newly synthesized after recovery from acute thrombocytopenia: they found that while expression levels of Asn52 monodeamidated Bcl-xL remains unchanged, Asn52Asn66 doubly-deamidated Bcl-xL is virtually absent in young platelets and accumulates in old platelets. Therefor the Asn52Asn66 doubly-deamidated Bcl-xL could be used as a reliable biomarker for determining the age of platelets.

Figure 1:
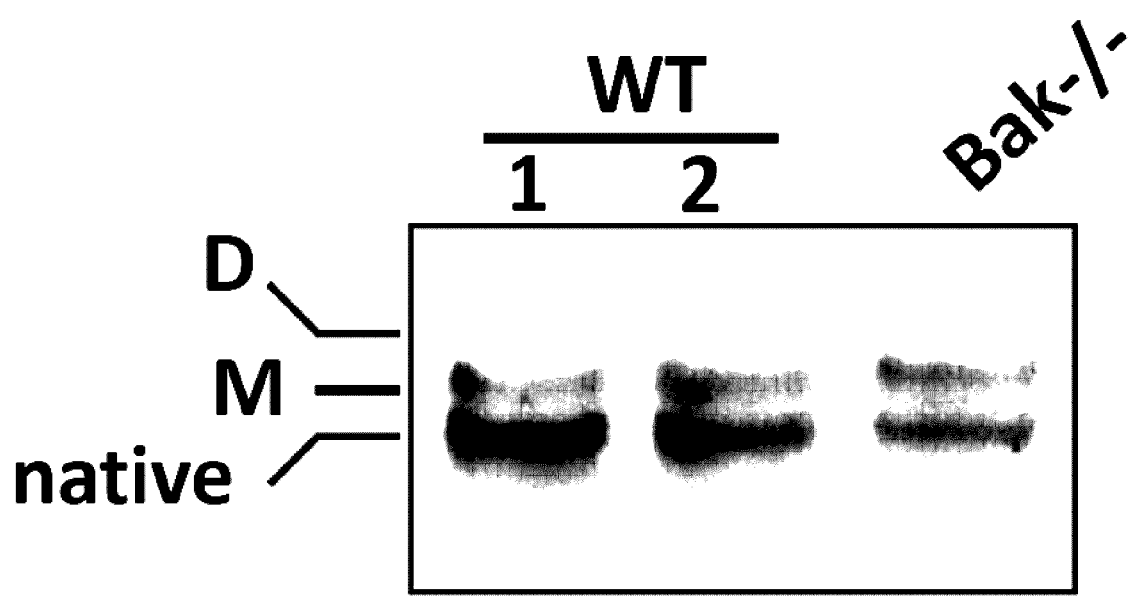

10 Claims, 3 Drawing Sheets
Specification includes a Sequence Listing.

SEQUENCE LISTING

```
<160> NUMBER OF SEQ ID NOS: 1

<210> SEQ ID NO 1
<211> LENGTH: 233
<212> TYPE: PRT
<213> ORGANISM: Homo sapiens

<400> SEQUENCE: 1

Met Ser Gln Ser Asn Arg Glu Leu Val Val Asp Phe Leu Ser Tyr Lys
1               5                   10                  15

Leu Ser Gln Lys Gly Tyr Ser Trp Ser Gln Phe Ser Asp Val Glu Glu
            20                  25                  30

Asn Arg Thr Glu Ala Pro Glu Gly Thr Glu Ser Glu Met Glu Thr Pro
        35                  40                  45

Ser Ala Ile Asn Gly Asn Pro Ser Trp His Leu Ala Asp Ser Pro Ala
    50                  55                  60

Val Asn Gly Ala Thr Gly His Ser Ser Ser Leu Asp Ala Arg Glu Val
65                  70                  75                  80

Ile Pro Met Ala Ala Val Lys Gln Ala Leu Arg Glu Ala Gly Asp Glu
                85                  90                  95

Phe Glu Leu Arg Tyr Arg Arg Ala Phe Ser Asp Leu Thr Ser Gln Leu
            100                 105                 110

His Ile Thr Pro Gly Thr Ala Tyr Gln Ser Phe Glu Gln Val Val Asn
        115                 120                 125

Glu Leu Phe Arg Asp Gly Val Asn Trp Gly Arg Ile Val Ala Phe Phe
    130                 135                 140

Ser Phe Gly Gly Ala Leu Cys Val Glu Ser Val Asp Lys Glu Met Gln
145                 150                 155                 160

Val Leu Val Ser Arg Ile Ala Ala Trp Met Ala Thr Tyr Leu Asn Asp
                165                 170                 175
```

```
His Leu Glu Pro Trp Ile Gln Glu Asn Gly Gly Trp Asp Thr Phe Val
            180             185                 190

Glu Leu Tyr Gly Asn Asn Ala Ala Ala Glu Ser Arg Lys Gly Gln Glu
        195             200             205

Arg Phe Asn Arg Trp Phe Leu Thr Gly Met Thr Val Ala Gly Val Val
        210             215             220

Leu Leu Gly Ser Leu Phe Ser Arg Lys
225             230
```

DOUBLE DEAMIDATED FORM OF Bcl-xL IS A BIOMARKER OF PLATELET AGE

SEQUENCE LISTING

This application includes as the Sequence Listing the complete contents of the accompanying text file "2021-12-09_11450726US_Seq.txt", created Nov. 3, 2021, containing 2,000 bytes, hereby incorporated by reference.

FIELD OF THE INVENTION

The present relates to the methods for determining the age of platelets and uses thereof in particular for characterizing the cause of thrombocytopenia.

BACKGROUND OF THE INVENTION

Platelets, also referred to as thrombocytes, are anuclear cell fragments that exist in mammalian blood and mediate blood clot formation and hemostasis. In addition, platelets release growth factors that play a significant role in the repair and regeneration of connective tissues and facilitate wound healing. Platelets are the terminal differentiation product of megakaryocytes (MK), which in turn originate from pluripotent stem cells of the bone marrow. Platelets have an average lifespan of about 5 to 10 days, and their physiological blood level in humans is normally 150,000 to 450,000/uL. When a patient's levels of circulating platelets are depleted below the physiological range, this condition is known as thrombocytopenia. Thrombocytopenia is typically associated with defective formation of hemostatic plugs and bleeding, wherein the risk of bleeding is inversely proportional to the platelet count. Four factors (1) decreased platelet production, (2) abnormal platelet distribution, (3) increased platelet destruction, and (4) increased platelet consumption are known as the mechanism of thrombocytopenia; however, its pathological features and causes vary widely. Accordingly, characterizing the cause of thrombocytopenia is thus really important to orientate the diagnosis and subsequently the treatment and in that aim identification of a biomarker of platelet age would be very useful.

Bcl-xL was already proposed to act as a molecular clock, regulating platelet life span (Mason et al., 2007). Bcl-$x_L$ is an oncogene that was characterized in 1993 as a member of the Bcl-2 family (for B-cell lymphoma 2) (Boise et al., 1993). Within the family, Bcl-xL shows the unique trait to be eligible for deamidation. While single deamidation of Asn52 was shown to improve the autophagic response in cells confronted to nutrient starvation (Beaumatin et al., 2016), the double deamidation of Bcl-xL on Asn52 and Asn66 was essentially shown to occur in response to DNA damage, and to cripple its anti-apoptotic activity. The Kile lab generated mice with a mutation in Bcl-xL, the Bcl xPlt20 mice, which showed decreased platelet counts (thrombocytopenia) due to shortened platelet life span (Mason et al., 2007). Besides, pharmacological inhibition of Bcl-xL with ABT 737 caused rapid thrombocytopenia, which is rescued by loss of Bak. Lastly, Bak−/− mice exhibited a marked increase in platelet numbers due to increased platelet half-life and deletion of Bak in Bcl x+/−mice rescued the thrombocytopenia of Bcl x+/−mice. Altogether this pioneer paper demonstrated that platelet life span is dictated by the balance between pro-survival Bcl-xL and pro-apoptotic Bak. To explain the mechanism by which the Bcl-xL/Bak axis controls platelet life span, the Kile group initially proposed the 'molecular clock' model: a platelet inherits from the megakaryocyte a certain amount of Bcl-xL that keeps Bak in check. Because platelets are anucleated with limited capacity to synthesize new proteins, the amount of Bcl-xL and Bak they inherit from the megakaryocyte is fixed. If the amount of Bcl-xL decreases more than the amount of Bak, Bak pro-death activity is unleashed and platelet apoptosis and clearance from the circulation ensues. This model is based on the hypothesis that Bcl-xL has a significantly shorter half life than Bak. More recent results from the same laboratory demonstrated that aged platelet have in fact the same amount of Bcl-xL that young ones (Josefsson, Dowling M R, Lebois M, Kile B T. The regulation of platelet life span. Chapter 3. Platelets 3rd Edition. Elsevier. Editor: Michelson A D. 2013 December; 51-66. ISBN-9780123878373), thus invalidating the molecular clock model, leaving the mechanism of how Bcl-xL activity declines in aged platelets unknown.

SUMMARY OF THE INVENTION

The present relates to the methods for determining the age of platelets and uses thereof in particular for characterizing the cause of thrombocytopenia. In particular, the present invention is defined by the claims.

DETAILED DESCRIPTION OF THE INVENTION

Deamidation is usually viewed as a post-translational modification that sets an expiration date on proteins. Among apoptosis regulators of the Bcl-2 family, Bcl-xL shows a unique eligibility to be either singly or doubly deamidated. While monodeamidation provides Bcl-xL with a gain of autophagic activity, double deamidation impairs Bcl-xL anti-apoptotic functions. One of the unique traits of platelets is to rely exclusively on the balance between anti-apoptotic Bcl-xL and pro-apoptotic Bak for their survival. How Bcl-xL is regulated to terminate platelet life is currently unknown. The inventors therefore analysed Bcl-xL deamidation state in platelets from mice models where platelets lifespan was manipulated. In parallel, the inventors compared human platelets obtained at steady state from healthy controls, to platelets newly synthesized after recovery from acute thrombocytopenia: they found that while expression levels of Asn52 monodeamidated Bcl-xL remains unchanged, Asn52Asn66 doubly-deamidated Bcl-xL is virtually absent in young platelets and accumulates in old platelets.

The first object of the present invention relates to a method of determining the age of a platelet comprising detecting in said platelet the presence of the Asn52Asn66 doubly-deamidated form of Bcl-xL and concluding that the platelet is a young platelet when the presence of said form is not detected or concluding that the platelet is an old platelet when the presence of said form is detected.

As used herein, the term "platelet" has its general meaning in the art and refers to a small anucleate cell produced by bone marrow megakaryocytes and that plays an essential role in blood clotting. As used herein, the term "young platelet" refers to a platelet having an age less than or equal to 1 day old. As used herein, the term "old platelet" refers to a platelet having an age superior to 1 day old.

As used herein, the term "Bcl-xL" has its general meaning in the art and refers to the human protein also known as B-cell lymphoma-extra large, having a sequence as set forth in SEQ ID NO: 1 and homologs and orthologs thereof.

As used herein, the term "Asn52Asn66 doubly-deamidated form of Bcl-xL" refers to the human protein having a sequence as set forth in SEQ ID NO: 1 wherein the asparagine residues at position 52 and 66 are substituted by an aspartic acid residue. Said form represents the biomarker of the present invention.

```
>sp|Q07817|B2CL1_HUMAN Bcl-2-like protein 1
OS = Homo sapiens OX = 9606 GN = BCL2L1 PE = 1
SV = 1 Asn52 and Asn66 are shown in bold and
underlined.
                                         SEQ ID NO 1
MSQSNRELVVDFLSYKLSQKGYSWSQFSDVEENRTEAPEGTESEMETPSF

AINGNPSWHLADSPAVNGATGHSSSLDAREVIPMAAVKQALREAGDEELR

YRRAFSDLTSQLHITPGTAYQSFEQVVNELFRDGVNWGRIVAFFSFGGAL

CVESVDKEMQVLVSRIAAWMATYLNDHLEPWIQENGGWDTFVELYGNNAA

AESRKGQERFNRWFLTGMTVAGVVLLGSLFSRK
```

As used herein, the term "Asn52Asn66 doubly-deamidated form of Bcl-xL" refers to the human protein having a sequence as set forth in SEQ ID NO: 1 wherein the asparagine residues at position 52 and 66 are substituted by an aspartic acid residue or an isoaspartic acid residue. Said form represents the biomarker of the present invention.

As used herein, the term "Asn52 monodeamidated form of Bcl-xL" refers to the human protein having a sequence as set forth in SEQ ID NO: 1 wherein the asparagine residue at position 52 is substituted by an aspartic acid residue or an isoaspartic acid residue.

The method of the present invention is thus particularly suitable for determining the age of a population of platelets that is isolated from a blood sample.

As used herein, the term "blood sample" means a whole blood sample obtained from the patient. The blood sample according to the invention may be a platelet rich plasma sample. Standard methods for isolating platelets in a whole blood sample are well known in the art. For example, blood may be drawn from the patient following standard venipuncture procedure in vacutainers containing $0.10^9$ M sodium citrate. Platelet-rich plasma (PRP) may then be obtained by centrifugation at 120 g for 15 min (room temperature) followed by pipeting of the PRP layer. Alternatively, blood may be collected on acid-citrate-dextrose anticoagulant (ACD-A) to prepare washed platelets in the presence of apyrase (25 µg/mL) and prostaglandin E1 (100 nM) as previously reported (Jandrot-Perrus, M., et al., *Cross-linking of alpha and gamma-thrombin to distinct binding sites on human platelets. Eur J Biochem*, 1988. 174(2): p. 359-67).

According to the invention, the detection of the biomarker of the present invention is determined by any routine technique well known in the art.

In some embodiments, the detection of the biomarker is determined by a flow cytometric method. As used herein, the term "flow cytometric method" refers to a technique for counting cells of interest, by suspending them in a stream of fluid and passing them through an electronic detection apparatus. Flow cytometric methods allow simultaneous multiparametric analysis of the physical and/or chemical parameters of up to thousands of events per second, such as fluorescent parameters. Modern flow cytometric instruments usually have multiple lasers and fluorescence detectors. A common variation of flow cytometric techniques is to physically sort particles based on their properties, so as to purify or detect populations of interest, using "fluorescence-activated cell sorting". As used herein, "fluorescence-activated cell sorting" (FACS) refers to a flow cytometric method for sorting a heterogeneous mixture of cells from a biological sample into two or more containers, one cell at a time, based upon the specific light scattering and fluorescent characteristics of each cell and provides fast, objective and quantitative recording of fluorescent signals from individual cells as well as physical separation of cells of particular interest. Accordingly, FACS can be used with the methods described herein to isolate and detect the population of cells of the present invention. For example, fluorescence activated cell sorting (FACS) may be therefore used and typically involves use of a flow cytometer capable of simultaneous excitation and detection of multiple fluorophores (such as a BD Biosciences FACSCanto™ flow cytometer). The cytometric systems may include a cytometric sample fluidic subsystem, as described below. In addition, the cytometric systems include a cytometer fluidically coupled to the cytometric sample fluidic subsystem. Systems of the present disclosure may include a number of additional components, such as data output devices, e.g., monitors, printers, and/or speakers, softwares (e.g. (Flowjo, Laluza . . . ), data input devices, e.g., interface ports, a mouse, a keyboard, etc., fluid handling components, power sources, etc.

Typically, the presence of the biomarker is determined by using an antibody specific for the biomarker of the present invention. As used herein, the term "antibody" refers to an intact immunoglobulin or to a monoclonal or polyclonal antigen-binding fragment with the Fc (crystallizable fragment) region or FcR binding fragment of the Fc region. Antigen-binding fragments may be produced by recombinant DNA techniques or by enzymatic or chemical cleavage of intact antibodies. "Antigen-binding fragments" include, inter alia, Fab, Fab', F(ab')$_2$, Fv, dAb, and complementarity determining region (CDR) fragments, single-chain antibodies (scFv), single domain antibodies, chimeric antibodies, diabodies and polypeptides that contain at least a portion of an immunoglobulin that is sufficient to confer specific antigen binding to the polypeptide. The terms Fab, Fc, pFc', F(ab')$_2$ and Fv are employed with standard immunological meanings (Roitt, I. (1991) Essential Immunology, 7th Ed., (Blackwell Scientific Publications, Oxford)]. Such antibodies or antigen-binding fragments are available commercially from vendors such as R&D Systems, BD Biosciences, e-Biosciences, Biolegend, Proimmune and Miltenyi, or can be raised against these cell-surface markers by methods known to those skilled in the art.

As used herein, the term "specificity" refers to the ability of an antibody to detectably bind an epitope presented on an antigen, such as the Asn52Asn66 doubly-deamidated Bcl-xL, while having relatively little detectable reactivity with the Asn52 monodeamidated or non deamidated forms of Bcl-xL. Specificity can be relatively determined by binding or competitive binding assays, using, e.g., Biacore instruments, as described elsewhere herein. Specificity can be exhibited by, e.g., an about 10:1, about 20:1, about 50:1, about 100:1, 10.000:1 or greater ratio of affinity/avidity in binding to the specific antigen versus nonspecific binding to other irrelevant molecules. The term "affinity", as used herein, means the strength of the binding of an antibody to an epitope. The affinity of an antibody is given by the dissociation constant Kd, defined as [Ab]×[Ag]/[Ab-Ag], where [Ab-Ag] is the molar concentration of the antibody-antigen complex, [Ab] is the molar concentration of the unbound antibody and [Ag] is the molar concentration of the unbound antigen. The affinity constant Ka is defined by 1/Kd. Preferred methods for determining the affinity of mAbs can be found in Harlow, et al., Antibodies: A Laboratory Manual, Cold Spring Harbor Laboratory Press, Cold Spring Harbor, N.Y., 1988), Coligan et al., eds., Current Protocols in Immunology, Greene Publishing Assoc. and Wiley Interscience, N.Y., (1992, 1993), and Muller, Meth. Enzymol. 92:589-601 (1983), which references are entirely incorporated herein by reference. One preferred and standard method well known in the art for determining the affinity of mAbs is the use of Biacore instruments.

In some embodiments, the antibody is labelled with a tag to facilitate the isolation and detection of population of cells of the interest. As used herein, the terms "label" or "tag" refer to a composition capable of producing a detectable signal indicative of the presence of a target, such as, the presence of a specific cell-surface marker in a biological sample. Suitable labels include fluorescent molecules, radio-isotopes, nucleotide chromophores, enzymes, substrates, chemiluminescent moieties, magnetic particles, bioluminescent moieties, and the like. As such, a label is any composition detectable by spectroscopic, photochemical, biochemical, immunochemical, electrical, optical or chemical means. Non-limiting examples of fluorescent labels or tags for labeling the agents such as antibodies for use in the methods of invention include Hydroxycoumarin, Succinimidyl ester, Aminocoumarin, Succinimidyl ester, Methoxycoumarin, Succinimidyl ester, Cascade Blue, Hydrazide, Pacific Blue, Maleimide, Pacific Orange, Lucifer yellow, NBD, NBD-X, R-Phycoerythrin (PE), a PE-Cy5 conjugate (Cychrome, R670, Tri-Color, Quantum Red), a PE-Cy7 conjugate, Red 613, PE-Texas Red, PerCP, PerCPeFluor 710, PE-CF594, Peridinin chlorphyll protein, TruRed (PerCP-Cy5.5 conjugate), FluorX, Fluoresceinisothyocyanate (FITC), BODIPY-FL, TRITC, X-Rhodamine (XRITC), Lissamine Rhodamine B, Texas Red, Allophycocyanin (APC), an APC-Cy7 conjugate, Alexa Fluor 350, Alexa Fluor 405, Alexa Fluor 430, Alexa Fluor 488, Alexa Fluor 500, Alexa Fluor 514, Alexa Fluor 532, Alexa Fluor 546, Alexa Fluor 555, Alexa Fluor 568, Alexa Fluor 594, Alexa Fluor 610, Alexa Fluor 633, Alexa Fluor 647, Alexa Fluor 660, Alexa Fluor 680, Alexa Fluor 700, Alexa Fluor 750, Alexa Fluor 790, Cy2, Cy3, Cy3B, Cy3.5, Cy5, Cy5.5, Cy7, BV 785, BV711, BV421, BV605, BV510 or BV650.

The aforementioned assays may involve the binding of the antibodies to a solid support. The solid surface could be a microtitration plate coated with the antibodies. Alternatively, the solid surfaces may be beads, such as activated beads, magnetically responsive beads. Beads may be made of different materials, including but not limited to glass, plastic, polystyrene, and acrylic. In addition, the beads are preferably fluorescently labelled. In a preferred embodiment, fluorescent beads are those contained in TruCount™ tubes, available from Becton Dickinson Biosciences, (San Jose, California). In some embodiments, PBMC were stained for detection of cytokines production after stimulation in RPMI medium supplemented with 10% fetal bovine serum with PMA and ionomycin at 25 ng/mL and 1 µg/mL, respectively, in the presence of brefeldin A at 10 µg/mL for 6 hours at 37° C.

As being intra cellular located, the biomarker of the present invention is assessed by intracellular flow cytometry. Intracellular flow cytometry typically involves the permeabilization and fixation of platelets. Any convenient means of permeabilizing and fixing platelets may be used in practicing the methods. For example permeabilizing agent typically include saponin, methanol, Tween® 20, Triton X-100TM.

The method of the present invention is particularly suitable for characterizing the cause of thrombocytopenia. As used herein, the term "thrombocytopenia" has its general leaning in the art and refers to a condition in which an individual's blood has less than 150,000 platelets per microliter. Detecting a population of old platelets in a patient suffering from thrombocytopenia indicates (1) a decreased platelet production, or (2) an abnormal platelet distribution. Detecting a population of young platelets indicates (3) an increased platelet destruction, or (4) an increased platelet consumption. The method of the present invention is thus particularly suitable for orientating the diagnosis of thrombocytopenia and subsequently the treatment. In particular, decreased platelet production may be caused by dehydration, Vitamin B12 or folic acid deficiency, leukemia or myelodysplastic syndrome or aplastic anemia, decreased production of thrombopoietin by the liver in liver failure, sepsis, systemic viral or bacterial infection, such as leptospirosis or hereditary syndromes that include congenital amegakaryocytic thrombocytopenia, thrombocytopenia absent radius syndrome, Fanconi anemia, Bernard-Soulier syndrome, (associated with large platelets), May-Hegglin anomaly, Grey platelet syndrome, Alport syndrome and Wiskott-Aldrich syndrome. On the contrary, abnormally high rates of platelet destruction may be due to immune or non-immune conditions, including immune thrombocytopenic purpura, thrombotic thrombocytopenic purpura, hemolytic-uremic syndrome, disseminated intravascular coagulation, paroxysmal nocturnal hemoglobinuria, antiphospholipid syndrome, systemic lupus erythematosus, post-transfusion purpura, and neonatal alloimmune thrombocytopenia. Increased destruction may also be caused by hypersplenism, infections such as Dengue fever or Zika virus, or Gaucher's disease. Increased destruction may also be caused by a medication such as valproic acid, methotrexate, interferon, isotretinoin, panobinostat, H2 blockers and proton-pump inhibitors and chemotherapeutic agents in general such as carboplatin. The method of the present invention is thus particularly suitable for prescribing an appropriate therapy to the patient suffering from thrombocytopenia. In particular, the therapy consists in treating the underlying cause of the thrombocytopenia. For instance, if thrombocytopenia results from a decreased platelet production, transfusion may be of a particular interest. If the cause is a destruction of platelets due to an immune condition (such as production of immunoglobulins directed against platelets), the therapy can include corticoids and anti-inflammatory drugs. The therapy may also consists in an antibody depleting strategy, which typically include plasma exchange, plasmapheresis or immunoadsorption. In some embodiments, the therapy consists in administering immunoglobulins (e.g. by intravenous route). In some embodiments, the therapy consists in cell therapy or gene therapy.

The invention will be further illustrated by the following figures and examples. However, these examples and figures should not be interpreted in any way as limiting the scope of the present invention.

FIGURES

FIG. 1: Platelets were isolated from the indicated mice. Total proteins were extracted and 25 µg were separated on tris-taurine-glycine minigels. Immunodetection of Bcl-x was performed, and revealed 3 bands: native Bcl-$x_L$, N52 monodeamidated Bcl-$x_L$ (M) and doubly deamidated Bcl-$x_L$ (D) as described in Beaumatin F. et al. *N52 monodeamidated Bcl-xL shows impaired oncogenic properties in vivo and in vitro*. Oncotarget. 2016 Mar. 29; 7(13):17129-43.

Figure 2:
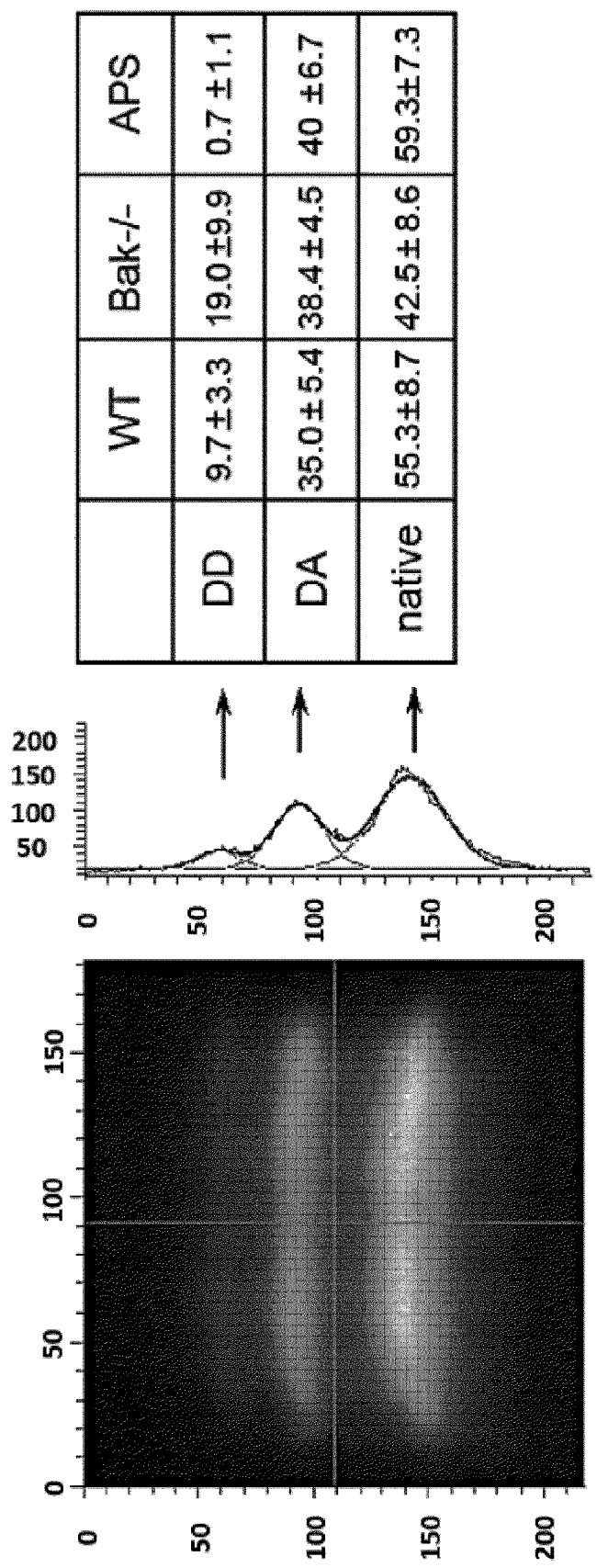

FIG. 2: In order to resolve the signal corresponding respectively to native, mono and doubly-deamidated Bcl-$x_L$ in platelets isolated from WT, APS-treated and Bak−/− mice, a Gaussian fit was applied to the densitometric profiles obtained after Bcl-x immunodetection, and the respective areas were used to calculate the percentage of each specie. The percentages are reported in the table (WT mice, n=3; Bak−/− mice, n=4; APS-treated mice, n=6). An example of the fit is shown on platelets isolated from WT mice.

Figure 3:
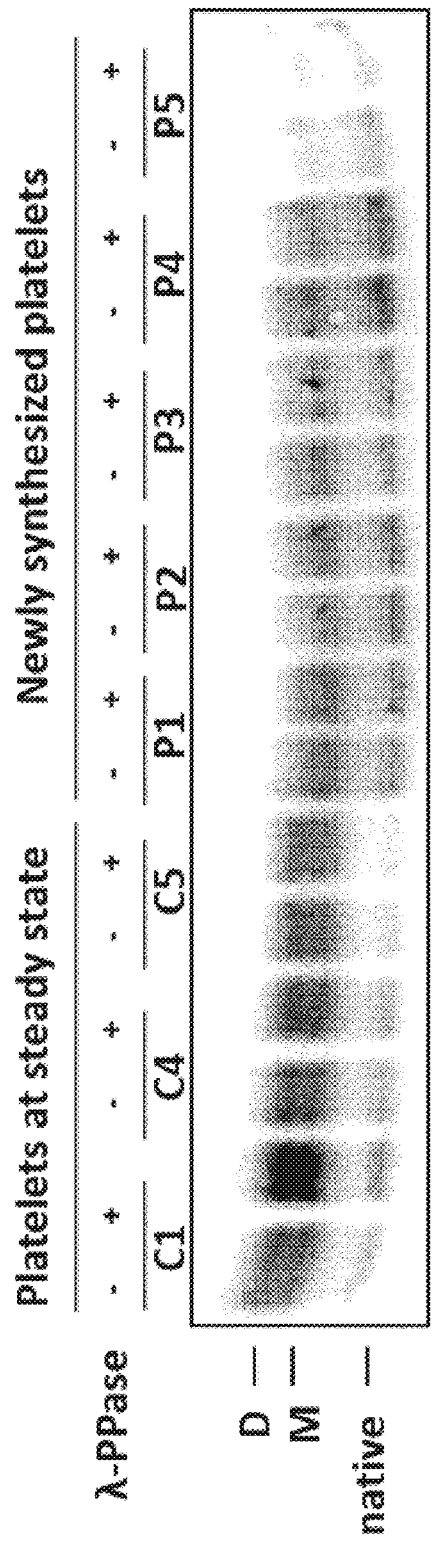

FIG. 3: Human platelets were isolated from healthy donors and from treated patients recovering from acute thrombocytopenia (either due to chemotherapy or Immune Thrombocytopenic Purpura (ITP)). Total proteins were extracted and treated or not with k-phosphatase. 30 µg were separated on 30 cm long Laemmli gels. Immunodetection of Bcl-x was performed, and revealed 3 bands: native Bcl-$x_L$, N52 monodeamidated Bcl-$x_L$ (M) and doubly deamidated Bcl-$x_L$ (D).

EXAMPLE

Our aim was to explore whether Bcl-$x_L$ deamidation state could be a biological age marker for platelets. Circulating platelets have the particular trait to essentially rely on Bak to implement their termination by apoptosis (for review (Lebois and Josefsson, 2016)). Therefore, knocking out Bak is exquisitely suited to increase platelet lifespan, and circulating platelets isolated from Bak-deficient mice live longer than normal. FIG. 1 shows that such "old" platelets exhibit an increase in doubly-deamidated Bcl-$x_L$, confirming the correlation between deamidated Bcl-$x_L$ and platelet age. An accurate quantification of the amount of native, singly-deamidated, and doubly deamidated Bcl-$x_L$ in platelets isolated from WT, APS-treated or Bak−/− mice was performed: a Gaussian fit (FIG. 2) was applied on the densitometric profiles obtained from western blots, and we found that while expression levels of Asn52 monodeamidated Bcl-$x_L$ shows no statistical difference between all three conditions, Asn52Asn66 doubly-deamidated Bcl-$x_L$ is virtually absent in young platelets (APS treatment) and significantly accumulates in old platelets (Bak−/− samples).

We collected human platelet samples from healthy donors and from patients recovering from acute thrombocytopenia after treatment. We found (FIG. 3) that Bcl-$x_L$ detection in platelets from patients recovering from acute thrombocytopenia only shows native and mono-deamidated Bcl-$x_L$, while in platelets from healthy donors, the native protein is consumed by the deamidation process with time, and mainly distributes into mono- and doubly-deamidated Bcl-xL.

We conclude that the proof of concept achieved with genetically manipulated mice extends to physio-pathological cases in humans, and that doubly-deamidated Bcl-$x_L$ is a bona fide age marker.

REFERENCES

Throughout this application, various references describe the state of the art to which this invention pertains. The disclosures of these references are hereby incorporated by reference into the present disclosure.

The invention claimed is:

1. A method of treating thrombocytopenia in a subject comprising determining the age of a platelet isolated from the subject's blood, comprising the steps of detecting in said platelet the presence of the an Asn52Asn66 doubly-deamidated form of Bcl-xL; and
   (a) determining that the platelet is a young platelet when the presence of said form is not detected and administering a transfusion to the subject;
   or
   (b) determining that the platelet is an old platelet when the presence of said form is detected and administering at least one treatment selected from the group consisting of a corticoid, and antibody depletion,
   wherein antibody depletion is plasma exchange, plasmapheresis or immunoadsorption.

2. The method of claim 1 wherein the detection is performed with a binding partner specific for the Asn52Asn66 doubly-deamidated form of Bcl-xL.

3. The method of claim 2 wherein the binding partner is an antibody.

4. The method of claim 2 wherein the binding partner is labelled with a label selected from the group consisting of fluorescent molecules, radioisotopes, nucleotide chromophores, enzymes, substrates, chemiluminescent moieties, magnetic particles, and bioluminescent moieties.

5. The method of claim 1 wherein the detection is performed by a flow cytometric method.

6. The method of claim 5 wherein the flow cytometric method is an intracellular flow cytometry method.

7. The method of claim 1, wherein the age of the young platelet is equal to one day or less.

8. The method of claim 1, wherein the age of the old platelet is greater than one day.

9. A method of characterizing the cause of and treating thrombocytopenia in a subject in need thereof, comprising determining the age of platelets in a blood sample from the subject by detecting the absence or presence of an Asn52Asn66 doubly-deamidated form of Bcl-xL, and
   ii) treating the subject for decreased platelet production by administering a transfusion to the subject when the Asn52Asn66 doubly-deamidated form of Bcl-xL is not present; or
   ii) treating the subject for destruction of platelets due to an immune condition by providing to the subject one or more treatments selected from: administering a corticoid and antibody depletion, wherein antibody depletion is plasma exchange, plasmapheresis or immunoadsorption.

10. The method of claim 9, wherein the virtual absence of the Asn52Asn66 doubly-deamidated form of Bcl-xL indicates that the platelets are equal to or less than one day old and the presence of the Asn52Asn66 doubly-deamidated form of Bcl-xL indicates that the platelets are greater than one day old.

* * * * *